US010635114B2

(12) United States Patent
Rakshit et al.

(10) Patent No.: US 10,635,114 B2
(45) Date of Patent: Apr. 28, 2020

(54) OPTIMIZING SPACE UTILIZATION

(71) Applicant: INTERNATIONAL BUSINESS MACHINES CORPORATION, Armonk, NY (US)

(72) Inventors: Sarbajit K. Rakshit, Kolkata (IN); Shilpa S. Shetty, Bangalore (IN)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 16/379,949

(22) Filed: Apr. 10, 2019

(65) Prior Publication Data

US 2019/0235518 A1 Aug. 1, 2019

Related U.S. Application Data

(63) Continuation of application No. 15/991,474, filed on May 29, 2018, now Pat. No. 10,345,820, which is a
(Continued)

(51) Int. Cl.
*G05D 1/02* (2020.01)
*G05D 1/00* (2006.01)
(Continued)

(52) U.S. Cl.
CPC ....... *G05D 1/0225* (2013.01); *B62D 15/0285* (2013.01); *G05D 1/0027* (2013.01);
(Continued)

(58) Field of Classification Search
CPC ..... G05D 1/0225; G05D 1/0027; H04L 67/12
(Continued)

(56) References Cited

U.S. PATENT DOCUMENTS 9,139,199 B2   9/2015   Harvey
9,857,796 B2   1/2018   Rakshit et al.
(Continued)

FOREIGN PATENT DOCUMENTS

| CN | 103198704 | 7/2013 |
| WO | 2014072909 | 5/2014 |
| WO | 2015114592 | 6/2015 |

OTHER PUBLICATIONS

Jeremy J. Michalek et al., "Architectural Layout Design Optimization", Eng. Opt., vol. 34(5), 2002, pp. 461-484.
(Continued)

*Primary Examiner* — Yazan A Soofi
(74) *Attorney, Agent, or Firm* — Michael O'Keefe; Matthew M. Hulihan; Heslin Rothenberg Farley & Mesiti PC

(57) ABSTRACT

Vehicle positioning in a parking area is provided by obtaining vehicle information of vehicles for positioning in the parking area, identifying unutilized parking space in the parking area, then based on recognizing a vehicle movement event, determining an optimized layout for the vehicles, the optimized layout including position for each vehicle of the vehicles, the vehicle movement event including (i) actual or anticipated arrival of an arriving vehicle to be positioned in the parking area or (ii) actual or anticipated departure of a departing vehicle departing from the parking area, and positioning one or more vehicles of the vehicles to conform to the determined optimized layout, the positioning including automatically controlling movement of at least one autonomous vehicle of the one or more vehicles and repositioning a vehicle, of the one or more vehicles, that is a different vehicle than the arriving vehicle or departing vehicle.

20 Claims, 8 Drawing Sheets

Related U.S. Application Data continuation of application No. 15/720,145, filed on Sep. 29, 2017, now Pat. No. 10,082,794, which is a continuation of application No. 15/151,559, filed on May 11, 2016, now Pat. No. 9,857,796.

(51) Int. Cl.

| | |
|---|---|
| *H04L 29/08* | (2006.01) |
| *B62D 15/02* | (2006.01) |
| *H04W 4/029* | (2018.01) |
| *H04W 4/40* | (2018.01) |
| *G08G 1/14* | (2006.01) |
| *G08G 1/015* | (2006.01) |
| *G08G 1/056* | (2006.01) |
| *G08G 1/01* | (2006.01) |

(52) U.S. Cl.
CPC .......... *G05D 1/0297* (2013.01); *G08G 1/015* (2013.01); *G08G 1/056* (2013.01); *G08G 1/14* (2013.01); *G08G 1/143* (2013.01); *G08G 1/144* (2013.01); *G08G 1/146* (2013.01); *H04L 67/12* (2013.01); *H04W 4/029* (2018.02); *H04W 4/40* (2018.02); *H05K 999/99* (2013.01); *G05D 2201/0213* (2013.01); *G08G 1/0112* (2013.01); *G08G 1/0129* (2013.01)

(58) Field of Classification Search
USPC ............................................ 701/2
See application file for complete search history.

(56) References Cited

U.S. PATENT DOCUMENTS

| | | | |
|---|---|---|---|
| 10,082,794 B2 | 9/2018 | Rakshit et al. | |
| 2014/0046506 A1 | 2/2014 | Reichel et al. | |
| 2014/0232562 A1 | 8/2014 | Gupta et al. | |
| 2015/0070196 A1* | 3/2015 | Beaurepaire | G08G 1/162 340/932.2 |
| 2015/0149022 A1 | 5/2015 | Harvey | |
| 2015/0149265 A1* | 5/2015 | Huntzicker | B60W 30/06 705/13 |
| 2015/0241241 A1 | 8/2015 | Cudak et al. | |
| 2015/0370255 A1* | 12/2015 | Harvey | B62D 15/0285 701/24 |
| 2016/0240082 A1* | 8/2016 | Mielenz | G08G 1/141 |
| 2018/0275669 A1 | 9/2018 | Rakshit et al. | |

OTHER PUBLICATIONS

Karthik T. et al., "Improvization of Productivity Through Layout Optimization in Pump Industry", International Journal of Lean Thinking, vol. 3(2), Dec. 2012, pp. 90-101.

"Method and System for Parking and Fetching Vehicles in a Parking Area", ip.com, ip.com No. 000243082, 4 pgs.

List of IBM Patents or Applications Treated as Related, Apr. 10, 2019, pp. 1-2.

\* cited by examiner

OPTIMIZING SPACE UTILIZATION

BACKGROUND

Vehicles are available in a variety of different types and sizes, and consequently their dimensions range from relatively small to relatively large. With variations in vehicle dimension, different sized vehicles require different sized, dimensioned, and shaped parking spaces. However, parking different sized vehicles in a common parking area generally results in an inefficient use of the parking area, and consequently a significant amount of unutilized parking space. This is especially true when vehicles arrive and leave at different times and the positioning of the vehicles is performed by several unrelated vehicle operators, rather than being overseen and coordinated by a common entity.

SUMMARY

Shortcomings of the prior art are overcome and additional advantages are provided through the provision of a computer-implemented method that includes obtaining vehicle information of a plurality of vehicles, the plurality of vehicles for positioning in a parking area and the vehicle information comprising vehicle dimension and driving direction; identifying occupied areas of the parking area and comparing the identified occupied areas to a total area size of the parking area to identify unutilized parking space in the parking area; based on recognizing a vehicle movement event, determining an optimized layout for the plurality of vehicles, the optimized layout comprising position for each vehicle of the plurality of vehicles, the position including vehicle orientation and location within the parking area, and the vehicle movement event comprising (i) actual or anticipated arrival of an arriving vehicle to be positioned in the parking area or (ii) actual or anticipated departure of a departing vehicle departing from the parking area; and positioning one or more vehicles of the plurality of vehicles to conform to the determined optimized layout, the positioning comprising automatically controlling movement of at least one autonomous vehicle of the one or more vehicles and repositioning a vehicle, of the one or more vehicles, that is a different vehicle than the arriving vehicle or departing vehicle.

Further, a computer program product including a computer readable storage medium readable by a processor and storing instructions for execution by the processor is provided for performing a method that includes: obtaining vehicle information of a plurality of vehicles, the plurality of vehicles for positioning in a parking area and the vehicle information comprising vehicle dimension and driving direction; identifying occupied areas of the parking area and comparing the identified occupied areas to a total area size of the parking area to identify unutilized parking space in the parking area; based on recognizing a vehicle movement event, determining an optimized layout for the plurality of vehicles, the optimized layout comprising position for each vehicle of the plurality of vehicles, the position including vehicle orientation and location within the parking area, and the vehicle movement event comprising (i) actual or anticipated arrival of an arriving vehicle to be positioned in the parking area or (ii) actual or anticipated departure of a departing vehicle departing from the parking area; and positioning one or more vehicles of the plurality of vehicles to conform to the determined optimized layout, the positioning comprising automatically controlling movement of at least one autonomous vehicle of the one or more vehicles and repositioning a vehicle, of the one or more vehicles, that is a different vehicle than the arriving vehicle or departing vehicle.

Yet further, a computer system is provided that includes a memory and a processor in communications with the memory, wherein the computer system is configured to perform a method including: obtaining vehicle information of a plurality of vehicles, the plurality of vehicles for positioning in a parking area and the vehicle information comprising vehicle dimension and driving direction; identifying occupied areas of the parking area and comparing the identified occupied areas to a total area size of the parking area to identify unutilized parking space in the parking area; based on recognizing a vehicle movement event, determining an optimized layout for the plurality of vehicles, the optimized layout comprising position for each vehicle of the plurality of vehicles, the position including vehicle orientation and location within the parking area, and the vehicle movement event comprising (i) actual or anticipated arrival of an arriving vehicle to be positioned in the parking area or (ii) actual or anticipated departure of a departing vehicle departing from the parking area; and positioning one or more vehicles of the plurality of vehicles to conform to the determined optimized layout, the positioning comprising automatically controlling movement of at least one autonomous vehicle of the one or more vehicles and repositioning a vehicle, of the one or more vehicles, that is a different vehicle than the arriving vehicle or departing vehicle.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Described herein are facilitates for positioning, including repositioning, vehicles in a parking area. Though examples provided herein are described in the context of cars and trucks, aspects described herein apply to other motorized vehicles, such as busses, motorcycles, recreational vehicles (RVs), boats, all-terrain vehicles, snowmobiles, or any other motorized transportation device, and even non-motorized vehicles such as bicycles.

Aspects described herein may be utilized, in some embodiments, with autonomous vehicles (sometimes referred to as driverless, self-driving, or robotic cars, though it is not necessarily the case that they always operate in a driverless manner). Autonomous vehicles may become ubiquitous in the future, presenting an opportunity to optimize parking space utilization in an autonomous vehicle ecosystem.

Figure 1:
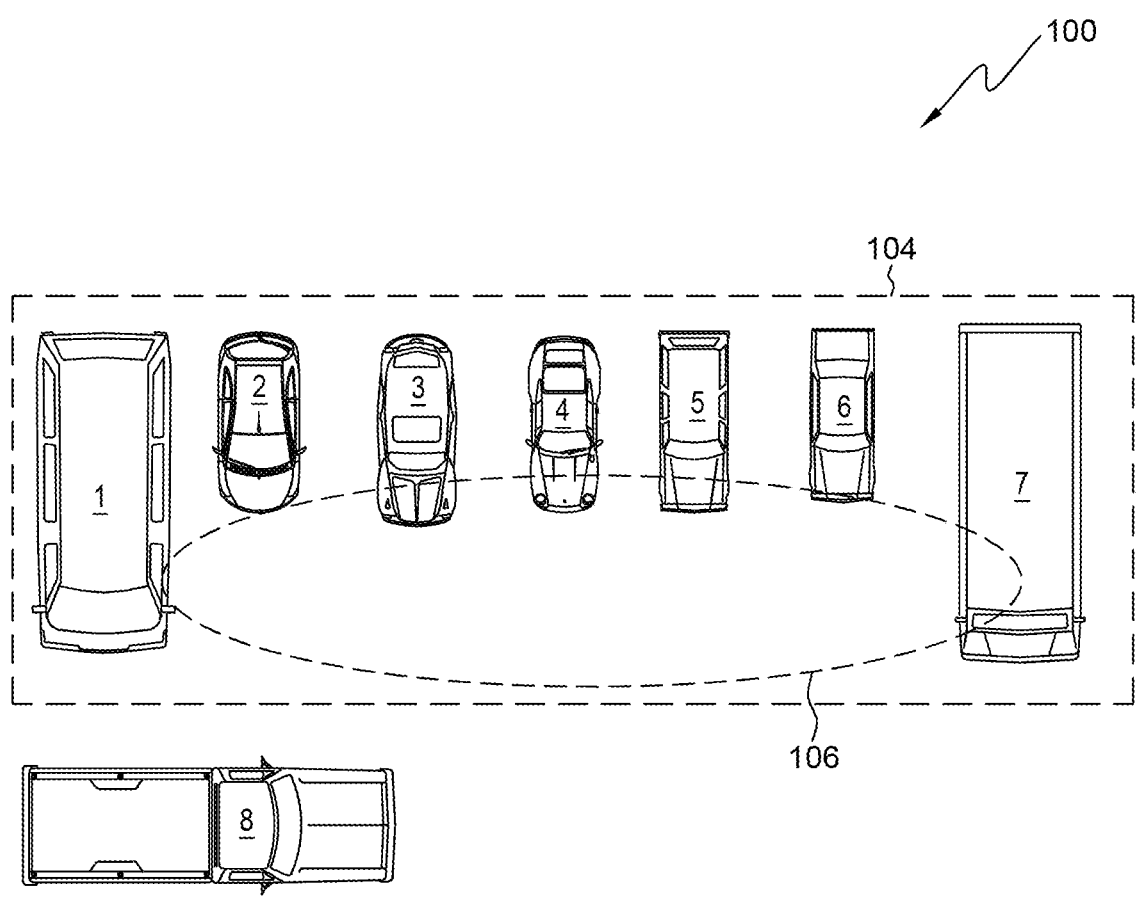
FIG. 1 illustrates an inefficient configuration of parked vehicles in a parking area, resulting in unutilized parking space.

FIG. 1 illustrates an inefficient configuration of parked vehicles in a parking area, resulting in unutilized parking space. Parking area 104 in environment 100 currently holds vehicles labeled 1 through 7. Due to the significant amount of unutilized parking space 106, generally due to the inefficient positioning of vehicles 1 through 7, the parking area is unable to accommodate arriving vehicle 8. The issue of unutilized parking space is partly because different sized vehicles are parked in a single parking space (e.g. vehicles 5 and 6 are relatively small but monopolize the same size parking spot that vehicle 7 occupies).

Aspects described herein provide automatic parking positioning/layout of vehicles in a parking area. In situations where the vehicles include, or perhaps consist entirely of, autonomous vehicles, the positioning/repositioning of the autonomous vehicle(s) can be controlled in part of in whole by a controller (such as a cloud server) to automatically position the vehicle(s) without requiring human vehicle drivers to position the vehicles.

By way of specific example and not limitation, software installed on a cloud server (a server connected to a local area network and/or wide area network, such as the internet) may identify the occupied portions of the parking area occupied by vehicles and compare this against the total available parking space in the parking area, to identify the unutilized parking space in that parking area. In some aspects, if an arriving vehicle—one that has arrived or is to arrive—requests or is anticipated to need a parking space in the parking area, software installed on the cloud server may assess whether the arriving vehicle can be accommodated in the parking area, perhaps with repositioning of one or more vehicles already parked in the parking area. Similarly, if a departing vehicle—one that is currently ready to depart from the parking area or is anticipated to depart at an identifiable future timeframe—the software may reassess the positioning of vehicles in the parking area to determine whether the layout of the vehicles can be optimized.

Regardless of arrival or departure, repositioning can be performed to optimize a layout given actual or anticipated vehicle movement events. Using the example of an arriving vehicle, software of the cloud server may determine whether one or more vehicles already present/parked in the parking area should be repositioned to create a parking space to accommodate the arriving vehicle.

Repositioning of vehicle(s) in the parking area may be dependent on various factors, such as predicted time of departure and positioning of a vehicle parked in the parking area, the dimension of the arriving vehicle and the vehicle(s) accommodated in the parking area, the dimensions of the vehicle(s) to be repositioned, and the dimensions of unutilized parking space, as examples.

To reposition an appropriate vehicle, software installed in the cloud server may temporarily move, or direct the movement of, other associated vehicles so that repositioning can be done in an effective manner.

Figure 2A:
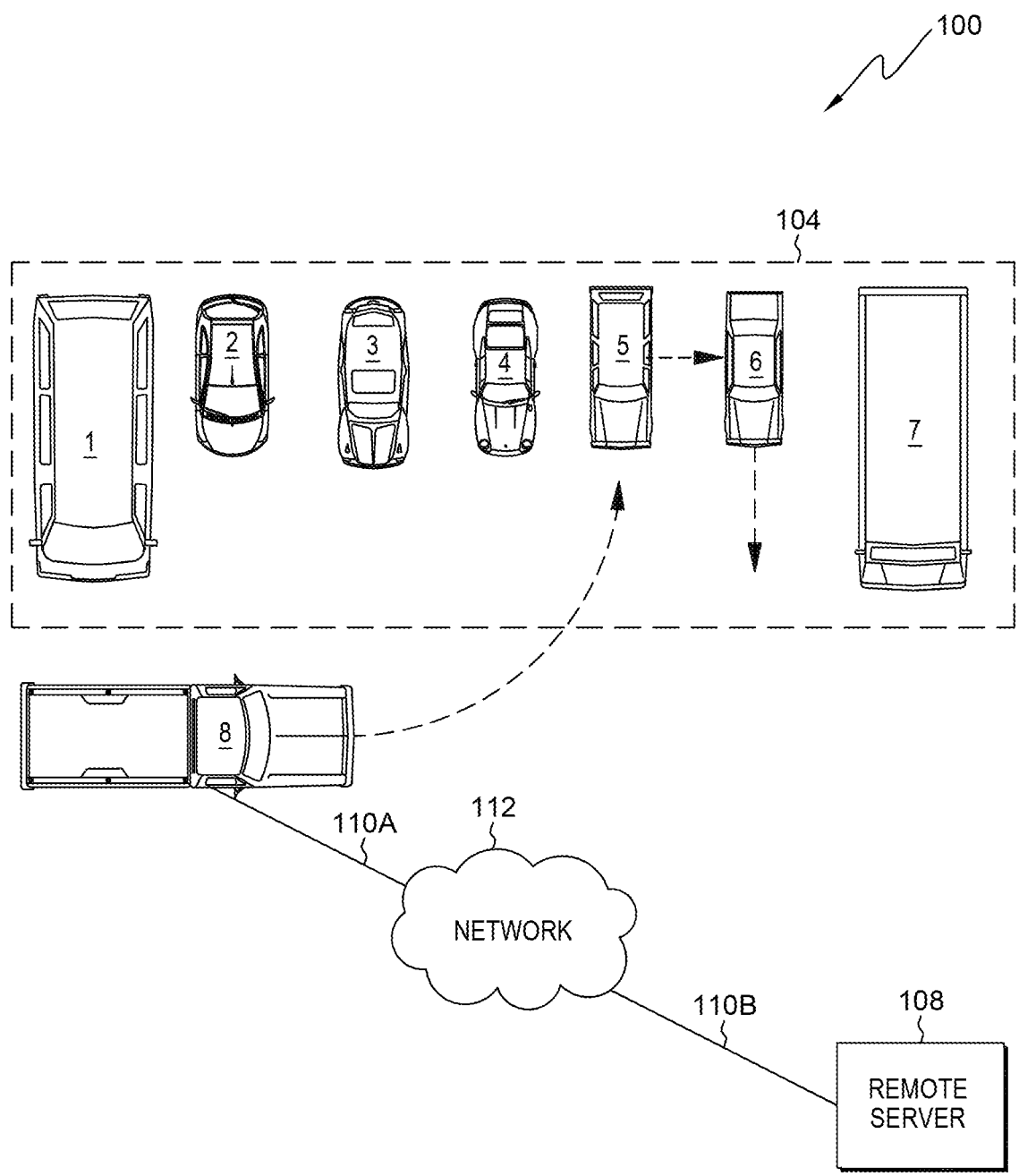
FIG. 2A depicts arrival of an arriving vehicle to be positioned in the parking area, and repositioning of vehicles based on the arrival of the arriving vehicle and based on determining an optimized layout, in accordance with aspects described herein.

FIG. 2A depicts arrival of an arriving vehicle to be positioned in the parking area, and repositioning of vehicles based on the arrival of the arriving vehicle and based on determining an optimized layout, in accordance with aspects described herein. Here, as in FIG. 1, vehicle 8 is an arriving vehicle to be positioned in the parking area 104 of environment 100. Environment 100 also includes a remote server 108 coupled to and in communication with a network 112 via communications link 110B. Vehicle 8 is in communication with network 112 via communications link 110A. In some examples, vehicle 8 includes or is associated with a computer system that is connected to network 112 via a wireless communication link 110A, such as a cellular, Wi-Fi, or other type of wireless connection. More generally, communications links 110A and 11B may be any appropriate wireless or wired communication link for communicating data. In some embodiments, connectivity of vehicle 8 to network 112 is made by proxy via a user's mobile device. For instance, a mobile device, such as a smartphone, of an occupant of vehicle 8 is connected to network 112 via a cellular or Wi-Fi connection, as examples. Additionally, one or more of vehicles 1-7 may also be in communication with remote server via network 112 or another network.

The vehicle 8 (or computer system associated therewith, such as a smartphone of an occupant) sends vehicle information about vehicle 8 to remote server 108 via network 112 across communications links 110A, 110B. The vehicle information includes any appropriate information about the vehicle that might help remote server 108 in the optimization of the layout of vehicles in parking area 104. Such information includes, as examples, vehicle dimension (e.g. dimensions of the vehicle, footprint, shape, etc., as examples examples) and driving direction. Driving direction indicates which direction is forward movement of the vehicle and which direction is reverse movement for the vehicle. The driving direction information enables the server to ascertain forward and reverse driving directions of the vehicle. Vehicles are generally driven in the forward direction and this information is useful for orienting the vehicle properly. This information is useful when queueing a vehicle for departure, for instance, so that the vehicle can egress in the forward driving direction rather than the reverse driving direction. Position of the engine relative to the front or rear wheels may be used as an indicator of driving direction.

The remote server 108 receives the vehicle information of vehicle 8, including its dimensions, and, based on this information, the remote server 108 assesses whether/how the layout of vehicles in parking area 104 should (potentially) be repositioned to accommodate the arriving vehicle 8 in an efficient manner. The layout encompasses both the layout for the existing vehicles in the parking area 104, as well as the positioning of the arriving vehicle, assuming it can be accommodated. FIG. 2A illustrates via arrows the repositioning that is identified. Here, vehicle 5 and vehicle 6 are to be positioned so that one is in front of the other. In this regard, vehicle 6 is predicted to depart the parking area before vehicle 5 departs (examples of this are explained below), so vehicle 6 is to move forward to free up space for vehicle 5, which is to occupy vehicle 6's current position. Vehicle 8 is then able to park in the position occupied by vehicle 5 in FIG. 2A.

Figure 2B:
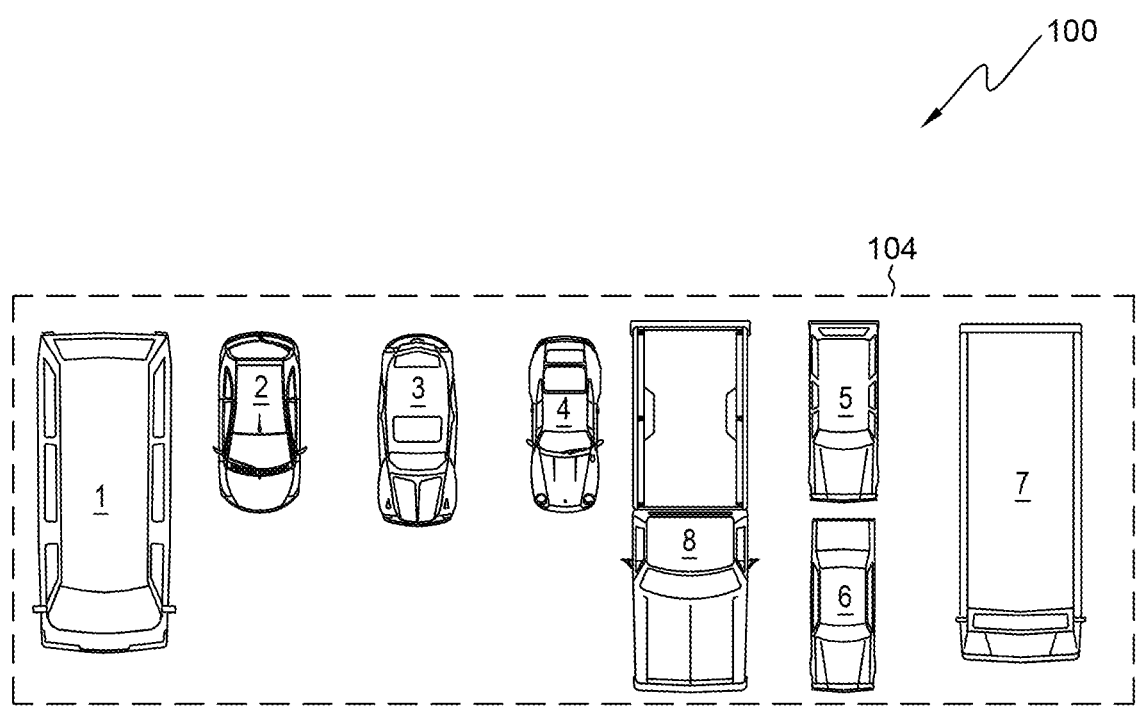
FIG. 2B depicts positioning of the vehicles in the parking area resulting from the vehicle arrival and repositioning of FIG. 2A, in accordance with aspects described herein.

FIG. 2B depicts positioning of the vehicles in the parking area resulting from the vehicle arrival and repositioning of FIG. 2A, in accordance with aspects described herein. Any vehicles that are autonomous vehicles and controllable via one or more computer systems may be automatically repositioned, that is the movement and repositioning thereof may be automated and performed by computer system(s). In some embodiments, the remote server 108 (FIG. 2A) or a computer system acting on behalf of, or in response to commands from, remote server 108 can control such an autonomous vehicle to effect its repositioning, park the vehicle (in the case that it is the arriving vehicle), or pull the vehicle out of the parking area 104 (in the case that the autonomous vehicle is a departing vehicle). Vehicles that are not automatically controlled may be driven and positioned by an operator in accordance with the optimized layout, as directed by the remote server.

As seen in FIG. 2B, vehicle 5 has been positioned in vehicle 6's former location, to sit behind vehicle 6, which is in its new position in front of vehicle 5. Meanwhile, arriving vehicle 8 has been positioned in vehicle 5's former location. It is noted that a position of a vehicle includes both the vehicle orientation and the location within the parking area. The layout determined based on arrival of vehicle 8 can dictate both location for the vehicle as well as its orientation, together the position that vehicle 8 is to occupy in the parking area. In FIG. 2B, vehicle 8 and all other vehicles in parking area 104 have been backed into their respective locations to orient them for efficient egress.

Figure 3A:
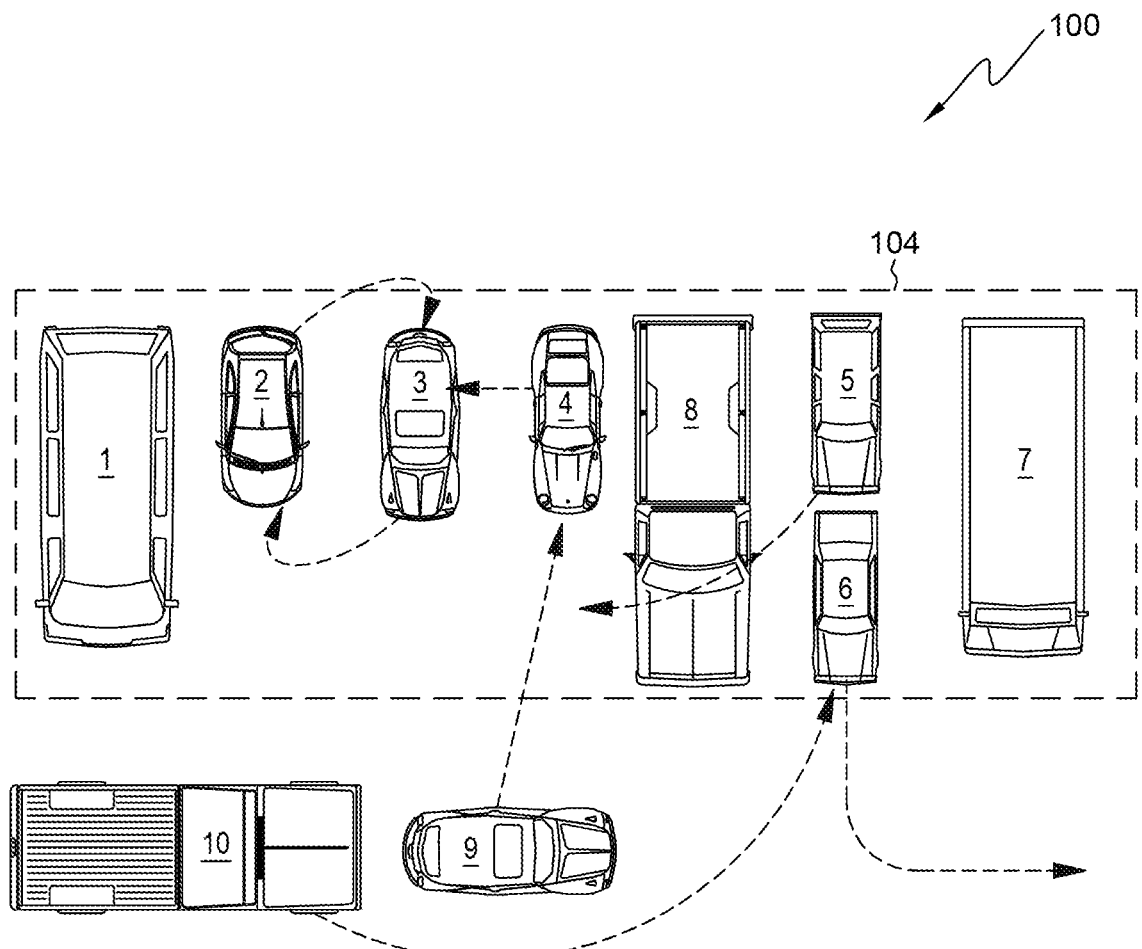
FIG. 3A depicts departure of a departing vehicle from the parking area together with arrival of two arriving vehicles to be positioned in the parking area, and repositioning of vehicles based on the departure and the arrivals and based on determining an optimized layout, in accordance with aspects described herein.
Figure 3B:
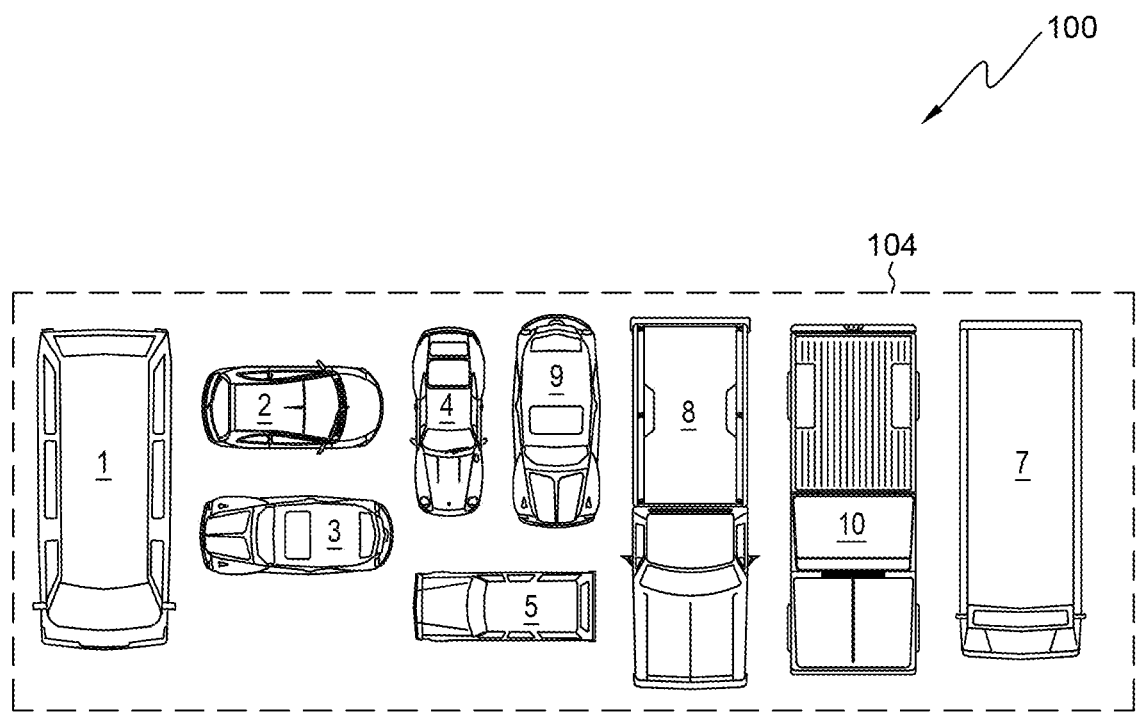
FIG. 3B depicts positioning of the vehicles in the parking area resulting from the vehicle departure, arrivals, and repositioning of FIG. 3A, in accordance with aspects described herein.

FIGS. 3A and 3B illustrate an additional situation with additional vehicle movement events. FIG. 3A depicts departure of a departing vehicle from the parking area together with arrival of two arriving vehicles to be positioned in the parking area, and repositioning of vehicles based on the departure and the arrivals and based on determining an optimized layout, in accordance with aspects described herein. Specifically, vehicle 6 is to depart the parking area 104, and vehicles 9 and 10 arrive to be positioned in the parking area. Accordingly, the remote server 108 or another computer system receives vehicle information about the arriving vehicles 9 and 10, and also information about the departing vehicle 6. The system then determines an optimized layout that accounts for vehicle 6's departure as well as the arrival of vehicles 9 and 10. Here as seen in FIGS. 3A and 3B, several vehicles are repositioned to create a parking space for vehicle 9 and make room for vehicle 10. Vehicles 2 and 3 are to be reoriented (including a rotation by 90 degrees) to create room for vehicle 4 to change location and move closer to vehicles 2 and 3. That frees up space for vehicle 9 in vehicle 4's former location. Meanwhile, vehicle 6 departs and vehicle 5 is repositioned and reoriented in front of vehicles 4 and 9, to make room for vehicle 10. In determining this layout, the system can account for expected or predicted departure times. For instance, vehicle 5 may be positioned in front of vehicles 4 and 9 on the basis that vehicle 5 is predicted to depart before both vehicles 4 and 9.

FIG. 3B depicts positioning of the vehicles in the parking area resulting from the vehicle departure, arrivals, and repositioning of FIG. 3A, in accordance with aspects described herein. Vehicles 9 and 10 have been oriented in their respective spaces such that they can pull directly out of the parking area 104 when clear to do so, and vehicle 5 sits in front of vehicles 4 and 9 and is unimpeded in its egress.

Thus, in accordance with aspects described herein, vehicle dimension, driving direction, and the available parking space is accounted for in the remote server's determination of the optimum parking layout. This determination can be made dynamically and involve all of the vehicles in the parking area (not just those that are arriving and those that are departing). In this regard, any vehicle in the parking area may considered for repositioning if the circumstances dictate. The layout can be optimized to maximize the number of vehicles that can be accommodated in the parking area and/or minimize unutilized space. Accordingly, the relative position and orientation of different vehicles can be changed from time to time when a vehicle movement event is triggered, and the system can ensure accommodation of a maximum number of vehicles in the parking area. The parking layout, i.e. relative locations, relative directions, and relative orientations of the vehicles in the parking area, can be dynamically reallocated based on vehicle movement events, corresponding to updated parking demand. Example vehicle movement events include arrival, predicted arrival, departure, and predicted departure of a vehicle.

A holistic approach is taken rather than focusing on identifying a particular location for an arriving vehicle and considering the required movement of only the vehicle(s) proximate that location to accommodate the arriving vehicle. In accordance with aspects described herein, the optimized layout determined is for the collective plurality of vehicles in the parking area, meaning that all vehicles (not just the ones proximate the destination of the arriving vehicle) may be considered for potential repositioning, in order to ensure a maximum number of vehicles can be accommodated in the defined parking area. This is exemplified in FIGS. 3A and 3B above where vehicles 9 & 10 arrive and need space, and vehicle 6 is departing the area. The optimized layout changes the location and orientation of vehicles 2 & 3, placing vehicle 3 in front of vehicle 2 based on predicted departure time from the parking area, while enabling minimal disturbance for vehicle 2 to depart even if vehicle 3 remains (For example, vehicle 1 can move forward and vehicle 2 can depart without disturbing other vehicles). In this example, neither vehicle 2 nor 3 are proximate arriving vehicles 9 and 10.

Additionally, the parking location of vehicle 5 has changed which is also not proximate to arriving vehicles 9 and 10. Based on the re-positioning/orientation of vehicles 2, 3, 4 and 5, space for vehicles 9 and 10 has been created. This optimization extends beyond, e.g., adjusting space in front, behind, or on the side of the vehicles.

Because repositioning vehicles, even temporarily to allow a blocked vehicle to egress, is time consuming, the optimization of the layout can ensure minimum aggregate disturbance of the vehicles in the parking area when positioning vehicles in the parking lot. Predictive analysis can be performed to optimize arrival/departure timing and parking space utilization. Predicted departure times of a given vehicle from the parking area may be based on monitoring actions of an individual to arrive at the parking area and occupy the departing vehicle. The actions may include behavior of the individual and encompass other information about the individual, such as the individual's proximity to the parking area. This can be accomplished by tracking movement of the individual, where the individual is in relation to a process (such as checking out at the grocery store), or examining historic behavior of the person, such as the tendency for the individual to leave work at 5:00 PM each day and arrive at the parking area 5 minutes thereafter.

By way of specific example, the monitoring may be location-based, such as identifying that the individual is standing at a nearby billing counter. The system can estimate the time that the user will arrive after paying the bill. Additionally or alternatively, the system can detect activity or behavior by the user indicating where the user is in a process and predict time of arrival to the parking area based on that. If the system detects that a payment for the user was just processed, it can assume the user will be leaving the billing counter shortly and predict the individual's time of arrival at the parking area. Another example of location-based prediction involves sensing that the user is approaching the parking area using proximity, GPS, or other sensors. Another example of behavior-based prediction is the use of historic information about the individual. The system can predict the amount of time that the user typically spends doing tasks such as eating in a restaurant or watching a movie, and predict when the individual will arrive at the parking area to occupy the parked vehicle and depart.

Predicted departure time can be used not only to ready the vehicle (potentially reposition the vehicle) for egress in a manner that reduces disruption to other vehicles when the vehicle departs, but also when initially positioning the vehicle based its arrival or the arrival of another vehicle. In the Examiner of FIGS. 3A and 3B, vehicle 5 is positioned for more ready egress than vehicles 4 and 9, on the basis that vehicle 5 is predicted to depart before vehicles 4 and 9.

The optimization may similarly rely on predicted arrival times. Arrival times may be predicted based on explicit requests for a parking space at a particular time in the future or predicted arrival time in the future. A user can request a spot ahead of time, or the system can learn when the vehicle is likely to arrive and assume it will need a space in the parking area at that time, for example. Thus, the predicted arrival times may be based on implicit/assumed requests. The implicit requests may be assumed based on past behavior, such as the tendency for the same vehicle to arrive at approximately the same time on the same schedule across a time period (e.g. Monday through Friday at 8:35 AM). The optimization may also rely on identification of vehicle dimensions.

As noted, in redesigning the parking layout, vehicles that are predicted to depart earlier may be kept in front or more easily accessible than later-departing vehicles. Additionally or alternatively, both the position and direction of any vehicle in the parking lot may be considered for potential dynamic change based on available space and vehicle movement events. The new parking position of the vehicle(s) can be arranged based on predicted departure time/arrival of the individual to occupy a departing vehicle, which prediction may be based on real time and/or historical input, near real time data (e.g. actions that the user is currently performing, such as paying a bill), and predicted arrival time of a vehicle. An autonomous vehicle or a user utilizing a mobile application can request a parking space before arriving at the parking area so that the system can consider this request and trigger a vehicle movement event to cause re-optimization of the layout based on this updated information. The optimization function can be tailored to minimize disturbance of vehicles in the parking area based on future vehicle movement events (e.g. to accommodate a departing or arriving vehicle).

Therefore, based on, e.g., vehicle dimension, driving direction and available parking space, a cloud server can calculate the optimum parking layout dynamically for all of the involved vehicles in the parking area, so that a maximum number of vehicles can be accommodated in the parking area. The relative position and direction of different vehicles can be changed from time to time upon scenario changes, and the system can ensure accommodation of the maximum number of vehicles.

An example of a specific implementation of aspects described herein is now provided, involving autonomous vehicles. Initially, vehicle parameters such as dimension, height, driving direction, engine position, etc. are maintained by each autonomous vehicle as vehicle metadata and shared with a remote (cloud) server. The cloud server obtains an indication of the total area of the parking area, and identifies the parked vehicles in the parking space, and accordingly will identify the unutilized parking space in the parking area.

Each vehicle can be identified by the owner/operator, and the cloud server or an associated component can track the proximity of this individual to predict a departure of the vehicle. For instance, it can determine when the individual is approaching the vehicle, utilize historical pattern analysis to determine when the individual will arrive for departure, and/or analyze relative activity performed by the individual, like that the individual is at the billing counter. Accordingly, the cloud server can predict when the individual will request the autonomous vehicle for departure.

When an arriving autonomous vehicle requests a parking space in the parking area, it can communicate with the cloud server to share vehicle information such as vehicle dimension (including height, width, length), driving direction, and any other pertinent or requested information. The cloud server can gather the data and analyze how vehicle(s) already present in the parking area and the arriving vehicle can be accommodated most efficiently in the parking area. The cloud server can perform different permutations and combinations to optimally position the various different vehicles, which might involve repositioning vehicles, perhaps ones that are otherwise not blocking or occupying a space for the arriving vehicle. Optimizing the layout can be based on one or more definable, modifiable constraints or parameters, including the optimization function. Different circumstances may favor different optimizations to be made and/or emphasis or weighting of different considerations. Maximizing the number of vehicles that can be accommodated in the parking area may be prioritized over minimizing an average time to clear a path for egress when departing, for instance.

The cloud server can also check how to minimize disturbance (temporary repositioning) of the vehicles in order to park the arriving vehicle and consider the predictions about when vehicles in the parking area are expected to depart the parking area. The cloud server can account for these in the determination and optimization of the layout.

Once the optimum layout is determined, software can identify the vehicle(s) to reposition along with any that are to be temporary moved in order to enable the vehicles being repositioned to park in their relocated positions. The cloud server can cause the autonomous vehicle(s) to be controlled so that they occupy their appropriate locations in the parking area. Additionally, once the proper parking space is created for the arriving vehicle, the position can be communicated to the arriving vehicle for use in directing the vehicle to the appropriate position in the parking area.

Figure 4:
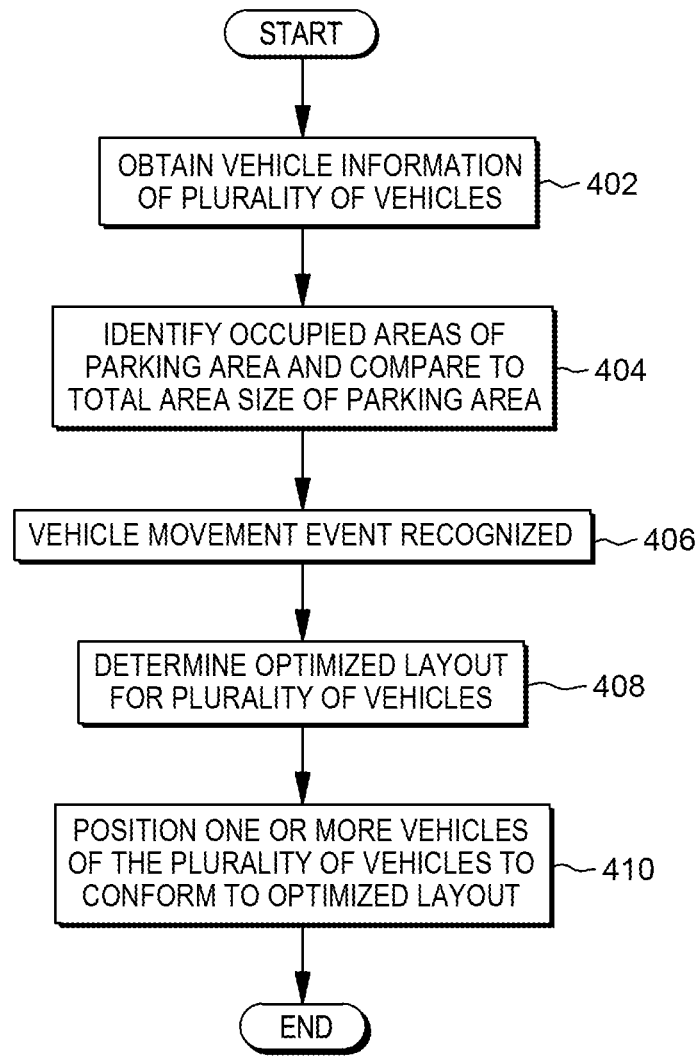
FIG. 4 depicts an example process for vehicle positioning in a parking area, in accordance with aspects described herein.

Accordingly, FIG. 4 depicts an example process for vehicle positioning in a parking area, in accordance with aspects described herein. In some examples, the process of FIG. 4 is performed by one or more computer system(s), such as a remote server in communication with one or more of a plurality of vehicles. Initially, the process begins by obtaining vehicle information of the plurality of vehicles (402), the plurality of vehicles for positioning in a parking area and the vehicle information including vehicle dimension and driving direction. The process proceeds by identifying occupied areas of the parking area and comparing the identified occupied areas to a total area size of the parking area (404) to identify unutilized parking space in the parking area.

At some point, a vehicle movement event is recognized (406). The vehicle movement event is or includes, as examples, (i) actual or anticipated arrival of an arriving vehicle to be positioned in the parking area or (ii) actual or anticipated departure of a departing vehicle departing from the parking area. Based on recognizing the vehicle movement event, the process determines an optimized layout for the plurality of vehicles (408). The optimized layout includes position for each vehicle of the plurality of vehicles, the position including vehicle orientation and location within the parking area.

The process proceeds by positioning one or more vehicles of the plurality of vehicles to conform to the determined optimized layout (410). The positioning includes, in the case of an autonomous vehicle of the plurality of vehicles, automatically controlling its movement, for instance by sending commands or other communications to cause the vehicle to move in a desired manner. In the case of a non-autonomous vehicle, the positioning can include providing direction to an operator of the vehicle or component of the vehicle informing where/how to position the vehicle in the parking area. The positioning can also include repositioning a vehicle, of the one or more vehicles, that is a different vehicle than the arriving vehicle or departing vehicle.

Determination of the optimized layout can consider and account for anticipated arriving vehicles and associated arrival times, and anticipated departing vehicles and associated departing times. The optimized layout can include new positions for the one or more vehicles that are positioned (see 410 of FIG. 4) to minimize subsequent repositioning of vehicles based on arrival of the anticipated arriving vehicles and departure of the anticipated departing vehicles.

The determination of the optimized layout can consider potential repositioning of all vehicles located within the parking area, not just those that are required to move in order to vacate the space at which an arriving vehicle is to park.

The determination of the optimized layout can consider a change in orientation of at least some, and possibly all, vehicles located within the parking area, for instance as illustrated by the reorientation of vehicles 2 and 3 in FIGS. 3A, 3B. In some examples, the repositioning of the at least one vehicle includes changing an orientation and a location of the at least one vehicle.

The determination of the optimized layout can include maximizing an amount of unused parking space of the parking area after the plurality of vehicles are positioned to conform to the optimized layout.

A vehicle movement event may include anticipated departure of a departing vehicle (i.e. a vehicle that will depart at some time in the future). In this scenario, the process can further include anticipating a departure time of the departing vehicle, which might include monitoring actions by an individual to arrive at the parking area and occupy the departing vehicle, and triggering the vehicle movement event at a time prior to the anticipated departure time, to trigger the determination of the optimized layout. Determining the optimized layout can include determining a new position for the departing vehicle that decreases impact on other vehicles of the plurality of vehicles when the departing vehicle departs the parking area. For instance, the new position for the departing vehicle might be a position that facilitates easier egress and less disturbance to surrounding vehicle(s). The positioning the one or more vehicles in this situation includes repositioning the departing vehicle in the parking area prior to the anticipated departure time from an initial position to the new position.

A vehicle movement event may include anticipated arrival of an arriving vehicle. In this scenario, the process can further include anticipating an arrival time of the arriving vehicle, which might be based on an express or assumed request for a parking space in the parking area for the arriving vehicle, and triggering the vehicle movement event at a time prior to the anticipated arrival time, to trigger the determination of the optimized layout. Determining the optimized layout can include determining a position in the parking area that the arriving vehicle is to occupy in the parking area.

The process can receive vehicle dimension and driving direction of the arriving vehicle, and the determination of the optimized layout may be based on the vehicle dimension and driving direction of the arriving vehicle, where an orientation of the arriving vehicle when occupying the determined position in the parking area is based on the driving direction of the arriving vehicle. For instance, the orientation can place the vehicle in a position allowing forward egress from the parking area without first reversing the vehicle.

The determination of the optimized layout can consider anticipated departure time of first and second vehicles of the plurality of vehicles. The optimized layout can position an anticipated earlier departing vehicle of the first and second vehicles in a position of greater accessibility to an exit/egress of the parking area than an anticipated later departing vehicle of the first and second vehicles. The positioning of the one or more vehicles positions the anticipated earlier departing vehicle in the position of greater accessibility.

In some examples, the plurality of vehicles are each autonomous vehicles, the movement of which is automatically operable by one or more computer systems, such as a computer system performing the process of FIG. 4, for instance a remote system.

Processes described herein may be performed singly or collectively by one or more computer systems, such as computer system(s) described below with reference to FIG. 5. In some embodiments, such a computer system may be or include a remote cloud server. Additionally, a computer system to perform aspects described herein may be a mobile device, such as a smartphone, or a computer system embedded in a vehicle, such as an autonomous vehicle.

Figure 5:
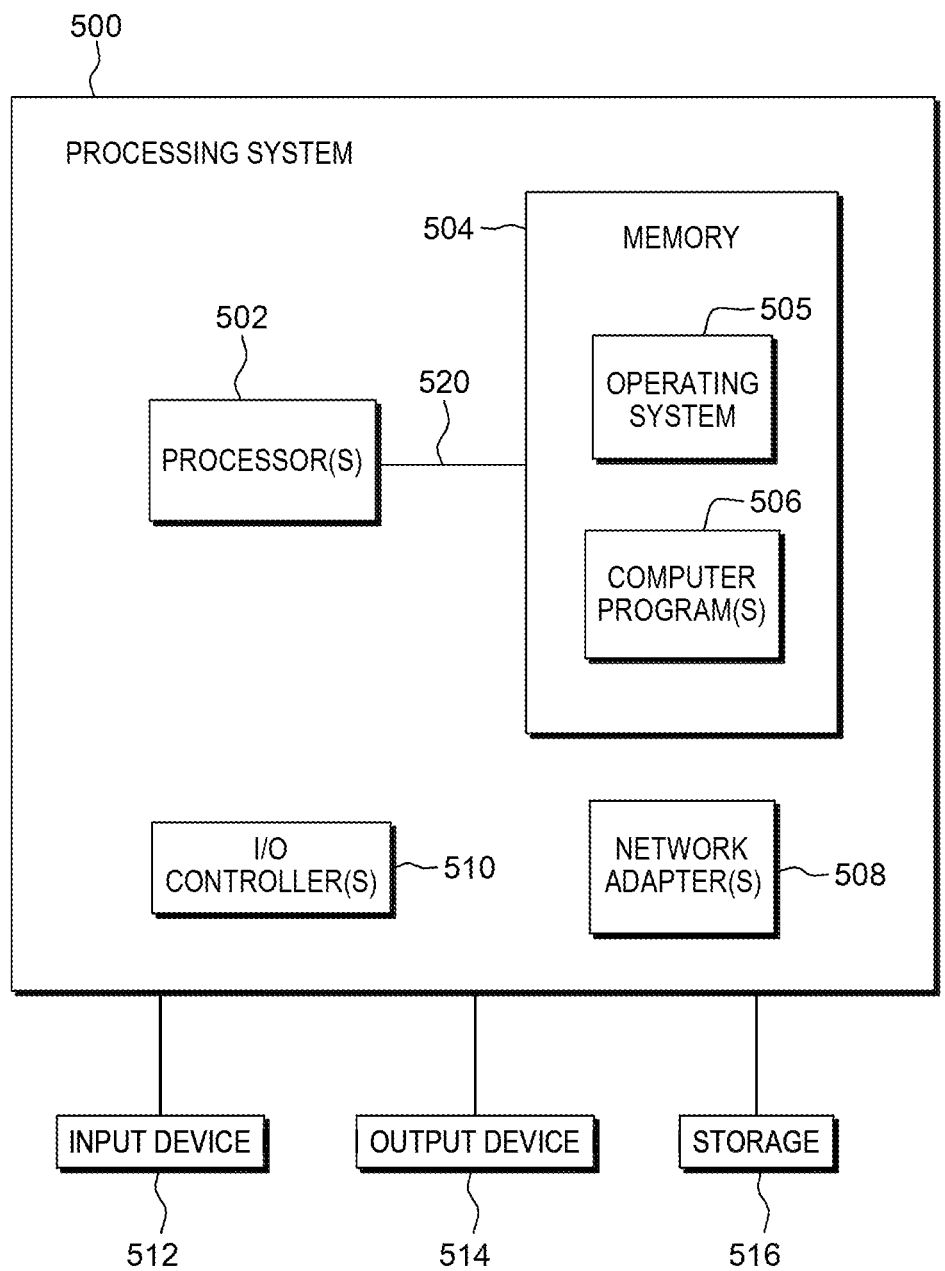
FIG. 5 depicts an example of a computer system to incorporate or use aspects described herein.

FIG. 5 depicts one example of a computer system to incorporate or use aspects described herein. A computer system may also be referred to herein as a processing device/system or computing device/system, or simply a computer. Computer system 500 may be based on one or more of various system architectures such as those offered by International Business Machines Corporation (Armonk, N.Y., USA) or Intel Corporation (Santa Clara, Calif., USA), as examples.

Computer system 500 is suitable for storing and/or executing program code and includes at least one processor 502 coupled directly or indirectly to memory 504 through, e.g., a system bus 520. In operation, processor(s) 502 obtain from memory 504 one or more instructions for execution by the processors. Memory 504 may include local memory employed during actual execution of the program code, bulk storage, and cache memories which provide temporary storage of at least some program code in order to reduce the number of times code must be retrieved from bulk storage during program code execution. A non-limiting list of examples of memory 504 includes a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Memory 504 includes an operating system 505 and one or more computer programs 506, for instance programs to perform aspects described herein.

Input/Output (I/O) devices 512, 514 (including but not limited to displays, microphones, speakers, accelerometers, gyroscopes, magnetometers, light sensors, proximity sensors, GPS devices, cameras, etc.) may be coupled to the system either directly or through I/O controllers 610.

Network adapter(s) 508 may also be coupled to the system to enable the computer system to become coupled to other computer systems, storage devices, or the like through intervening private or public networks. Ethernet-based (such as Wi-Fi) interfaces and Bluetooth® adapters are just examples of the currently available types of network adapters 508 used in computer systems.

Computer system 500 may be coupled to storage 516 (e.g., a non-volatile storage area, such as magnetic disk drives, optical disk drives, a tape drive, etc.), having one or more databases. Storage 516 may include an internal storage device or an attached or network accessible storage. Computer programs in storage 516 may be loaded into memory 504 and executed by a processor 502 in a manner known in the art.

The computer system 500 may include fewer components than illustrated, additional components not illustrated herein, or some combination of the components illustrated and additional components. Computer system 500 may include any computing device known in the art, such as a mainframe, server, personal computer, workstation, laptop, handheld or mobile computer, tablet, wearable device, telephony device, network appliance (such as an edge appliance), virtualization device, storage controller, etc.

Figure 6:
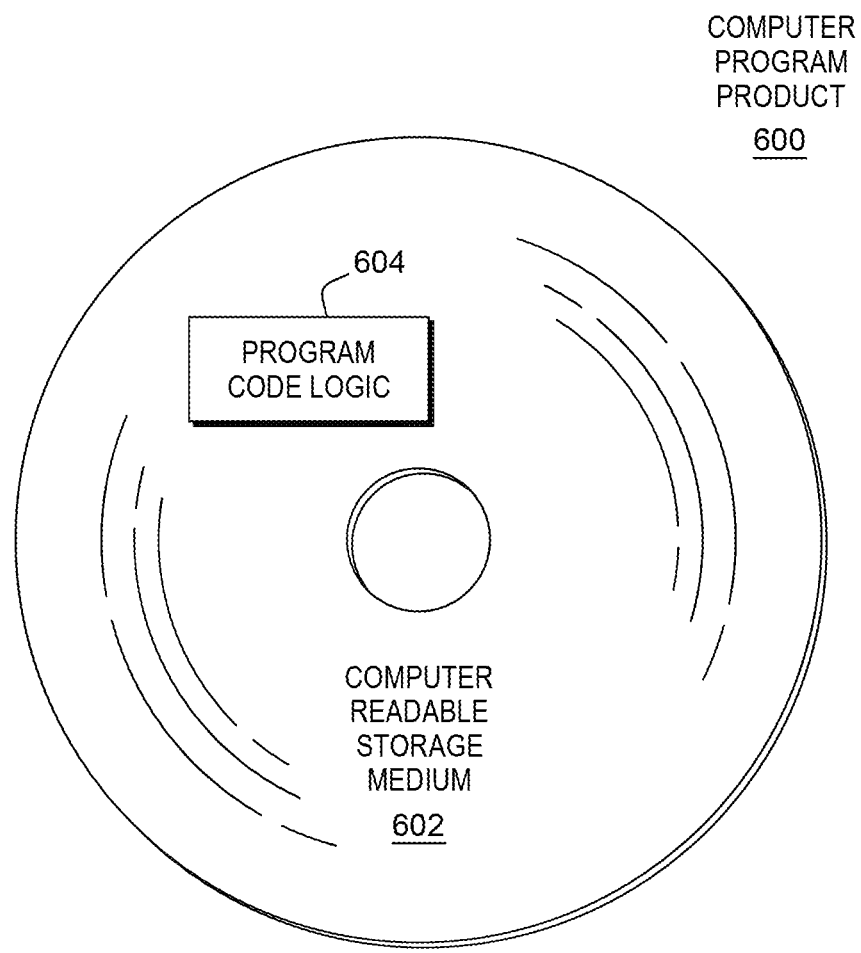
FIG. 6 depicts one embodiment of a computer program product.

Referring to FIG. 6, in one example, a computer program product 600 includes, for instance, one or more computer readable storage media 602 to store computer readable program code means, logic and/or instructions 604 thereon to provide and facilitate one or more embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:
   obtaining vehicle information of a plurality of vehicles, the plurality of vehicles for positioning in a parking area and the vehicle information comprising vehicle dimension and driving direction;
   identifying occupied areas of the parking area and comparing the identified occupied areas to a total area size of the parking area to identify unutilized parking space in the parking area;
   based on recognizing a vehicle movement event, determining an optimized layout for the plurality of vehicles to park in the parking area, the optimized layout comprising position for each vehicle of the plurality of vehicles to park in the parking area, the position including vehicle orientation and location within the parking area, wherein the optimized layout is a parking layout different from an initial parking layout of parked vehicles in the parking area, and wherein the optimized layout parks, at a given position in the parking area, a different vehicle and orientation thereof at the given position as compared to the initial parking layout, and wherein the vehicle movement event comprises (i) actual or anticipated arrival of an arriving vehicle to be positioned in the parking area or (ii) actual or anticipated departure of a departing vehicle departing from the parking area; and
   positioning one or more vehicles of the plurality of vehicles to conform to the determined optimized layout, the positioning parking the one or more vehicles in respective positions in the parking area, and the positioning comprising automatically controlling movement of at least one autonomous vehicle of the one or more vehicles and repositioning a vehicle, of the one or more vehicles, that is a different vehicle than the arriving vehicle or departing vehicle.

2. The computer-implemented method of claim 1, wherein the determining the optimized layout considers anticipated departure time of first and second vehicles of the plurality of vehicles, wherein the optimized layout parks an anticipated earlier departing vehicle of the first and second vehicles in a parking position of greater accessibility to an exit of the parking area than a parking position of an anticipated later departing vehicle of the first and second vehicles, and wherein the positioning the one or more vehicles parks the anticipated earlier departing vehicle in the parking position of greater accessibility.

3. The computer-implemented method of claim 1, wherein the determining the optimized layout considers potential repositioning of all vehicles located within the parking area.

4. The computer-implemented method of claim 1, wherein the determining the optimized layout considers a change in orientation of at least some vehicles located within the parking area.

5. The computer-implemented method of claim 1, wherein the determining the optimized layout comprises maximizing an amount of unused parking space of the parking area after the plurality of vehicles are positioned to conform to the layout.

6. The computer-implemented method of claim 1, wherein the repositioning the at least one vehicle comprises changing an orientation and location of the at least one vehicle.

7. The computer-implemented method of claim 1, wherein the obtaining, identifying, determining, and positioning are performed by a remote computer system in communication with the plurality of vehicles.

8. The computer-implemented method of claim 1, wherein each of the plurality of vehicles are autonomous vehicles, the movement of which is automatically operable by one or more computer systems.

9. A computer program product comprising:
a non-transitory computer readable storage medium readable by a processing circuit and storing instructions for execution by the processing circuit for performing a method comprising:
obtaining vehicle information of a plurality of vehicles, the plurality of vehicles for positioning in a parking area and the vehicle information comprising vehicle dimension and driving direction;
identifying occupied areas of the parking area and comparing the identified occupied areas to a total area size of the parking area to identify unutilized parking space in the parking area;
based on recognizing a vehicle movement event, determining an optimized layout for the plurality of vehicles to park in the parking area, the optimized layout comprising position for each vehicle of the plurality of vehicles to park in the parking area, the position including vehicle orientation and location within the parking area, wherein the optimized layout is a parking layout different from an initial parking layout of parked vehicles in the parking area, and wherein the optimized layout parks, at a given position in the parking area, a different vehicle and orientation thereof at the given position as compared to the initial parking layout, and wherein the vehicle movement event comprises (i) actual or anticipated arrival of an arriving vehicle to be positioned in the parking area or (ii) actual or anticipated departure of a departing vehicle departing from the parking area; and
positioning one or more vehicles of the plurality of vehicles to conform to the determined optimized layout, the positioning parking the one or more vehicles in respective positions in the parking area, and the positioning comprising automatically controlling movement of at least one autonomous vehicle of the one or more vehicles and repositioning a vehicle, of the one or more vehicles, that is a different vehicle than the arriving vehicle or departing vehicle.

10. The computer program product of claim 9, wherein the determining the optimized layout considers anticipated departure time of first and second vehicles of the plurality of vehicles, wherein the optimized layout parks an anticipated earlier departing vehicle of the first and second vehicles in a parking position of greater accessibility to an exit of the parking area than a parking position of an anticipated later departing vehicle of the first and second vehicles, and wherein the positioning the one or more vehicles parks the anticipated earlier departing vehicle in the parking position of greater accessibility.

11. The computer program product of claim 9, wherein the determining the optimized layout considers potential repositioning of all vehicles located within the parking area.

12. The computer program product of claim 9, wherein the determining the optimized layout considers a change in orientation of at least some vehicles located within the parking area.

13. The computer program product of claim 9, wherein the repositioning the at least one vehicle comprises changing an orientation and location of the at least one vehicle.

14. The computer program product of claim 9, wherein the obtaining, identifying, determining, and positioning are performed by a remote computer system in communication with the plurality of vehicles.

15. A computer system comprising:
a memory; and
a processor in communication with the memory, wherein the computer system is configured to perform a method, the method comprising:
obtaining vehicle information of a plurality of vehicles, the plurality of vehicles for positioning in a parking area and the vehicle information comprising vehicle dimension and driving direction;
identifying occupied areas of the parking area and comparing the identified occupied areas to a total area size of the parking area to identify unutilized parking space in the parking area;
based on recognizing a vehicle movement event, determining an optimized layout for the plurality of vehicles to park in the parking area, the optimized layout comprising position for each vehicle of the plurality of vehicles to park in the parking area, the position including vehicle orientation and location within the parking area, wherein the optimized layout is a parking layout different from an initial parking layout of parked vehicles in the parking area, and wherein the optimized layout parks, at a given position in the parking area, a different vehicle and orientation thereof at the given position as compared to the initial parking layout, and wherein the vehicle movement comprises (i) actual or anticipated arrival of an arriving vehicle to be positioned in the parking area or (ii) actual or anticipated departure of a departing vehicle departing from the parking area; and
positioning one or more vehicles of the plurality of vehicles to conform to the determined optimized layout, the positioning parking the one or more vehicles in respective positions in the parking area, and the positioning comprising automatically controlling movement of at least one autonomous vehicle of the one or more vehicles and repositioning a vehicle, of the one or more vehicles, that is a different vehicle than the arriving vehicle or departing vehicle.

16. The computer system of claim 15, wherein the determining the optimized layout considers anticipated departure time of first and second vehicles of the plurality of vehicles, wherein the optimized layout parks an anticipated earlier departing vehicle of the first and second vehicles in a parking position of greater accessibility to an exit of the parking area than a parking position of an anticipated later departing vehicle of the first and second vehicles, and wherein the positioning the one or more vehicles parks the anticipated earlier departing vehicle in the parking position of greater accessibility.

17. The computer system of claim 15, wherein the determining the optimized layout considers potential repositioning of all vehicles located within the parking area.

18. The computer system of claim 15, wherein the determining the optimized layout considers a change in orientation of at least some vehicles located within the parking area.

19. The computer system of claim 15, wherein the repositioning the at least one vehicle comprises changing an orientation and location of the at least one vehicle.

20. The computer-implemented method of claim 1, wherein the vehicle movement event comprises actual or anticipated arrival of an arriving vehicle to be positioned in the parking area.

* * * * *